July 7, 1970 C. D. EICHELBERGER ET AL 3,519,733

BUS STRUCTURE COMPRISING AN INSULATING SUPPORT AND A COATED ELECTRIC BUS BAR

Filed July 24, 1969

INVENTORS:
CHARLES D. EICHELBERGER,
PHILIP C. NETZEL,

BY William Freedman

ATTORNEY

1

3,519,734

CHROMA BLANKING CIRCUIT

James G. S. Chua, Roselle, and Bernard J. Okey, Elmwood Park, Ill., assignors to Admiral Corporation, Chicago, Ill., a corporation of Delaware Filed Aug. 28, 1967, Ser. No. 663,641
Int. Cl. H04n 9/50
U.S. Cl. 178—5.4 7 Claims

ABSTRACT OF THE DISCLOSURE

A chroma amplifier terminating in an emitter follower transistor providing a low impedance driving source for single ended color demodulators. During chroma blanking, the emitter follower transistor is driven into saturation to preserve the low impedance at the demodulator input.

Figure 1:
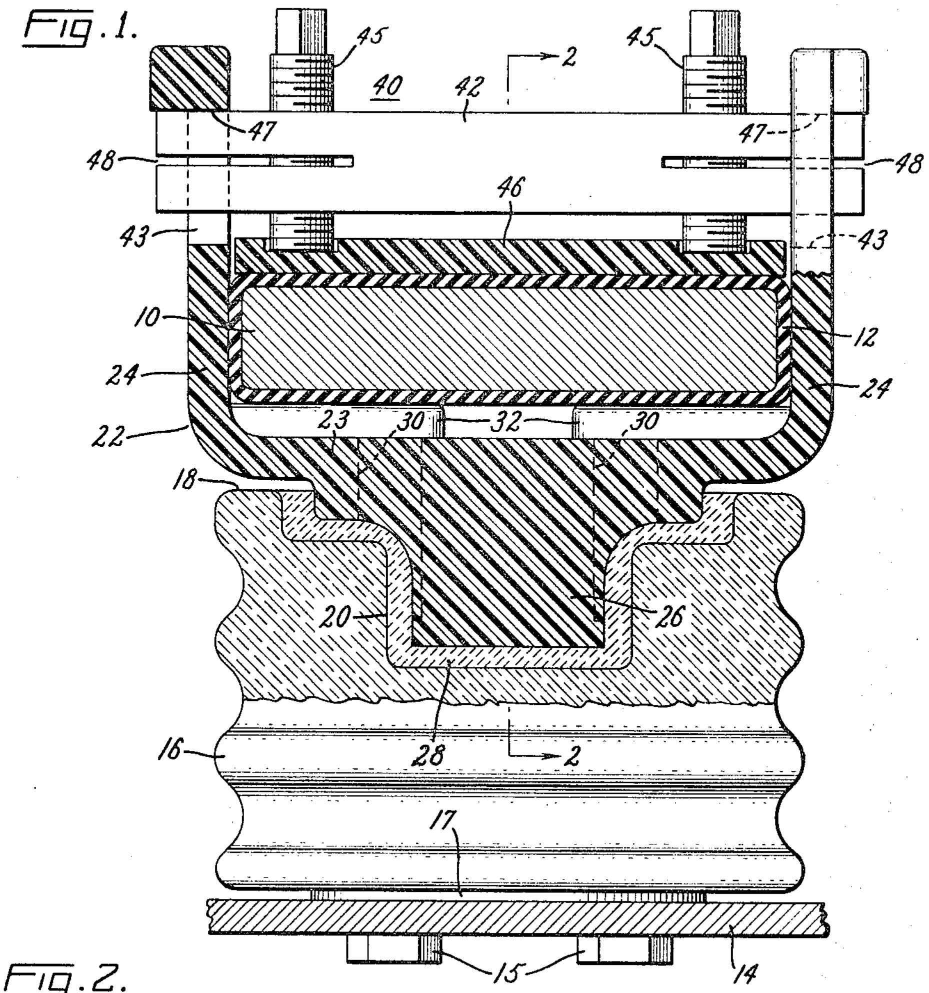

This invention concerns color television receivers and particularly blanking of the chroma signal in such receivers employing demodulators of the single ended or "reference signal biased" type.

It is well known that in color television receivers employing "key clamped" output circuits, it is important to keep the burst signal from appearing in the demodulators since a shift in background color would result therefrom. Chroma blanking, that is removing all information including the color burst during retrace time (horizontal blanking period), constitutes a known method employed in color television. Generally, there is no serious problem in chroma blanking and the process consists merely in cutting off one or more of the chroma amplifier stages during the blanking period.

This situation does not obtain, however, when the demodulator circuit is of the transistor single ended or reference signal biased type. In this case, to maintain the demodulator DC level and to prevent crosstalk between demodulator stages, it is necessary to maintain the chroma drive to the input circuit of the demodulator at a very low impedance level. Crosstalk isolation is obtained by providing a substantial impedance step-down for reference signals appearing across one stage of the demodulator with respect to the input of the other stage, and vice versa. This impedance step-down effect relies, in large part, upon the low impedance presented to the demodulators by the chroma amplifier. Consequently, if during blanking periods the chroma amplifier were cut off, the impedance at the input of the demodulator would increase and the operating point of the demodulator would shift.

A demodulator of the type described is fully disclosed in a copending application of Bernard J. Okey, Ser. No. 636,086, filed May 4, 1967. It will be understood that the demodulator in that application may be advantageously utilized with the invention of the instant application.

Accordingly, the principal object of this invention is to provide an improved color television circuit.

Another object of this invention is to provide a novel chroma blanking circuit especially suitable for use with single ended demodulators.

A further object of this invention is to provide a novel transistorized chroma system for a color television receiver utilizing a minimum of components.

Figure 2:
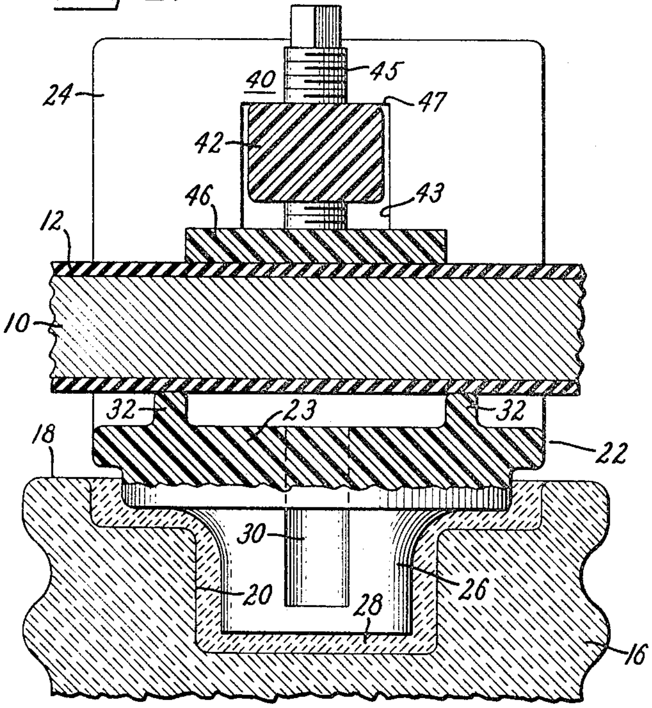

Other objects and advantages of the invention will become apparent upon a reading of the following specification in conjunction with the drawing in which:

FIG. 1 represents a partial schematic diagram of a color television receiver including a chroma amplifier, demodulator and chroma blanker; and FIG. 2 represents a modified form of a blanking circuit.

Turning attention to the embodiments of the invention

2 chosen for purposes of description, and in particular to FIG. 1, it will be noted that a rudimentary knowledge of color television principles and circuitry is assumed. Consequently, only the features of immediate interest in the instant application are shown, such items as tuners, deflection circuits, audio circuits, power supplies, etc. being eliminated for purposes of simplicity.

It will be understood that the chroma signal includes a burst of reference signal (3.58 mHz.) during retrace intervals and amplitude modulations of two different phases of the reference subcarrier (suppressed) during trace intervals. The reference signal or burst is used to control a local subcarrier oscillator which supplies two phase displaced 3.58 mHz. reference demodulation signals to the demodulator.

In FIG. 1, a portion of a chroma signal translation channel 10 is shown. In particular, a transistor 20, connected in an emitter follower configuration, and having an emitter electrode 21, a base electrode 22, and a collector electrode 23 is shown as the termination of the chroma channel. Collector 23 is connected to a source of positive potential through a resistor 14 and emitter 21 is connected to ground through a load resistor 15. A high frequency bypass capacitor 13 is connected between collector 23 and ground. A chroma input signal is supplied through a capacitor 11 to base 22 of transistor 20. The junction of capacitor 11 and base 22 is connected through a resistor 12 to a source of DC color killer potential. Under normal operating conditions, transistor 20 is in a conductive mode with forward current flowing in its base-emitter circuit. The forward current results from forward bias applied by circuitry (not shown) acting in cooperation with the color killer circuit. Thus, during periods of color signal reception, it will be understood that transistor 20 is conductive. During monochrome transmissions, the color killer applies a disabling DC voltage to the base of transistor 20. In its conductive condition, transistor 20 amplifies in emitter follower fashion and translates the chroma information appearing at its base electrode to the color demodulator.

Emitter resistor 15 of transistor 20 is coupled, through DC blocking capacitor 29, to the common input for a pair of demodulator transistors in demodulator 50. The demodulator will not be described in detail (reference has already been made to the copending application describing this circuit arrangement). Briefly, the demodulator circuit is coupled between two terminals N and P, which may be considered to represent negative and positive or, in accordance with the teachings of the above mentioned copending application, may be connected to respective filter networks and interconnected with the 3.58 mHz. reference signal source transistor in an arrangement for obtaining the DC stabilization benefits described in said application.

The demodulator transistors have their emitter electrodes connected to a common input circuit and their base electrodes connected to receive the aforementioned reference signals of 3.58 mHz. In order to demodulate the chroma signal to obtain the $R-Y$ and $B-Y$ color difference signals, for example, the reference signals must be phase displaced by 90°. It will be realized, of course, that other axis of demodulation may be selected, and by appropriate matrixing operations the desired $R-L$, $B-Y$ and $G-Y$ color difference signals obtained. With reference signal applied to its base electrode and chrominance signal applied to its emitter electrode, each transistor demodulates in accordance with the phase coincidence therebetween, in a well known manner. It will be noted that the DC level of the demodulator transistors is a function of the reference signal amplitude as they conduct on the negative half cycles of the reference signals. The output impedance of transistor 20 is very low in comparison with the resistance of resistors 51 and 52, As an incident to this clamping action, the reaction bar 42 is urged upwardly into engagement with the top walls 47 of openings 43 in the arms 24. A laterally-extending slot 48 provided in each end of the reaction bar 42 permits a small amount of deflection of the end of the bar, and this deflection serves to lock the associated screw 45 against accidental loosening while it is clamping the bus bar in position. The details of this clamping arrangement are not a part of our invention. Such details are explained more specifically and are claimed in application S.N. 844,366—Close, filed July 24, 1969 and assigned to the assignee of the present invention.

It should be noted that the clamping arrangement does not perforate or otherwise impair the insulating coating 12, which completely covers the bus bar 10 in the region of the insulating support. The clamping screws 45 act on the bearing plate 46, which serves as a barrier to protect insulating coating 12 and to distribute the clamping force more uniformly over the bus surface. The clamping arrangement will allow the bus bar to expand and contract along its length in response to temperature changes. Such expansion and contraction simply cause the insulated bus bar to move slightly in a longitudinal direction with respect to the bearing plate 46 and the rest of the support. Lateral movement of the bus bar 10 is opposed by the arms 24 which engage the insulating coating 12 on the lateral edges of the bus bar. These arms 24 are quite stiff in view of their substantial thickness and the reinforcement provided by ribs 32 and can therefore withstand relatively high laterally-directed forces without damage. Such forces can result from magnetic interaction between closely-adjacent bus bars. Movement of the bus bars away from the insulator 16 is prevented by the screws 45, which take such forces in compression, and the reaction bar 42 in which the screws are threaded.

The unbroken insulating coating on the bus bar 10 enables us to reduce electrical clearances between the bus bar and nearby structure at ground potential or some other differential potential. The use of such unbroken insulation is not in itself new. But, typically, the full reductions safely attainable with such unbroken insulation have not heretofore been realized because conventional porcelain insulators and conventional clamps have been used for supporting and mounting the bus bar. The conventional porcelain insulator has a metal end cap on which the bus bar is mounted, and the conventional clamp includes metal parts. Through capacitive coupling effects, high voltages approaching those of the bus bar can be built up on such metal hardware, even though out of contact with the bus bar. These high induced voltages can produce high electric stresses adjacent the metal parts which can cause an arc-over therefrom across the clearance space. This problem becomes especially severe if the clearance space has already been reduced to capitalize on the unbroken insulating coating on the bus bar.

We are able to substantially reduce the likelihood of such arc-overs because we have no metal structure adjacent the bus bar in the region of the support. Note particularly that the metal end cap typically present atop the insulator is absent. All the mounting structure and the clamping structure atop the porcelain insulator is of insulating material. Thus, there is no metal hardware adjacent the bus bar on which high voltages can be induced by capacitive effects.

By eliminating such metal harward and by utilizing an unbroken insulating coating on the bus bar 10, we are able to use 15 kv. metal-clad switchgear a supporting insulator rated for 5 kv. instead of the usual 15 kv. insulator. The 5 kv. insulator is 3½" long as compared to the 6" length of the 15 kv. insulator. We are also able to use a 3 inch spacing between the conductors of adjacent phases instead of the 6 inch spacing typically used in 15 kv. metal-clad equipment.

While we have shown and described a particular embodiment of our invention, it will be obvious to those skilled in the art that various changes and modifications may be made without departing from our invention in its broader aspects; and we, therefore, intended herein to cover all such changes and modifications as fall within the true spirit and scope of our invention.

What we claim as new and desire to secure by Letters Patent of the United States is:

1. Electic bus structure comprising:

(a) a bus bar, (b) a post-type insulator of porcelain supporting said bus bar, (c) a coating of insulating material completely covering all external surfaces of said bus bar in the general region of said insulator, (d) said post-type insulator having an end surface facing said bus bar and having a cavity in said end surface, (e) a U-shaped bracket of insulating material having a bight portion extending across said end surface and a pair of spaced-apart arms at opposite ends of said bight portion extending in a direction away from said insulator, (f) a plug on said bight portion extending into said cavity and bonded to said insulator, (g) means clamping said bus bar to said bracket in a position between said arms without perforating said insulating coating, (h) all of the structure adjacent said bus bar in the region of said insulator and all structure interposed between said insulator and said bus bar, including said bracket, plug and clamping means, being of insulating material.

2. The bus structure of claim 1 in which said bight portion is provided with integrally-formed ribs extending laterally of said bus bar and forming a seat against which said bus bar bears, said ribs projecting from said arms and being integrally joined thereto near said bight portion to increase the stiffness of the arms and resistance to deflection laterally of said bus bar.

3. The bus structure of claim 1 in which said arms are located closely adjacent the lateral edges of said bus bar so as to preclude substantial lateral movement of said bus bar with respect to said bracket and insulator.

References Cited

UNITED STATES PATENTS

| | | | |
|---|---|---|---|
| 2,246,904 | 6/1941 | Stockinger | 174—156 X |
| 3,180,922 | 4/1965 | Gallant et al. | 174—171 X |

FOREIGN PATENTS

Ad. 36,980 5/1930 France.

LARAMIE E. ASKIN, Primary Examiner

U.S. Cl. X.R.

174—156 ative during occurrence of said color burst information to drive said transistor emitter follower circuit into saturation thereby precluding transfer of said color burst information to said demodulator while maintaining the low impedance across said common input terminal.

6. In combination in a color television receiver as set forth in claim 5 further including; a switching transistor in said blanking means being driven into saturation during occurrence of said color burst information; and means coupling said switching transistor in parallel with said transistorized emitter follower output circuit.

7. In combination in a color television receiver as set forth in claim 6, wherein said transistorized emitter follower output circuit includes; a chroma transistor having a base electrode for receiving said chroma signal, a collector electrode coupled to a source of operating potential and an emitter electrode coupled to said common input terminal, and bias means forward biasing said chroma transistor; said switching transistor being connected to said collector electrode and, upon being driven into saturation, diminishing the potential at said collector electrode to the point where said bias means effectively drives said chroma transistor into saturation.

References Cited

UNITED STATES PATENTS 2,924,650 2/1960 Rennick ____________ 178—5.4

RICHARD MURRAY, Primary Examiner

J. C. MARTIN, Assistant Examiner